United States Patent [19]

Moberg

[11] Patent Number: 4,754,389

[45] Date of Patent: Jun. 28, 1988

[54] VOLTAGE REGULATING CIRCUITRY FOR A DC TO DC CONVERTER

[75] Inventor: Gregory O. Moberg, Rochester, N.Y.

[73] Assignee: Eastman Kodak Company, Rochester, N.Y.

[21] Appl. No.: 63,767

[22] Filed: Jun. 23, 1987

Related U.S. Application Data

[63] Continuation-in-part of Ser. No. 870,574, Jun. 4, 1986.

[51] Int. Cl.[4] ........................ H02M 3/24; H05B 41/26

[52] U.S. Cl. ........................................ 363/97; 320/21; 315/241 P; 354/145.1

[58] Field of Search .................................... 363/95-97; 323/284; 315/241 R, 241 P, 241 S; 320/1, 21; 354/145.1, 416

[56] References Cited

U.S. PATENT DOCUMENTS

| | | | |
|---|---|---|---|
| 3,863,128 | 1/1975 | Wilwerding | 315/241 P |
| 4,005,337 | 1/1977 | Rabe | 315/241 |
| 4,034,278 | 7/1977 | Gahler et al. | 320/1 |
| 4,068,151 | 1/1978 | Harrison | 315/241 |
| 4,071,884 | 1/1978 | Maigret | 363/95 X |
| 4,082,983 | 4/1978 | Adams, Jr. | 320/1 X |
| 4,128,786 | 12/1978 | Vital et al. | 315/151 |
| 4,298,827 | 11/1981 | Nakajima | 315/241 |
| 4,374,345 | 2/1983 | Takayama | 320/1 X |

*Primary Examiner*—Patrick R. Salce
*Assistant Examiner*—Emanuel Todd Voeltz
*Attorney, Agent, or Firm*—Dennis P. Monteith

[57] ABSTRACT

Voltage regulating circuitry maintains a load voltage of a DC to DC converter within a prescribed range. For that purpose, an SCR latching switch is connected to conduct upon the load voltage increasing to a predetermined upper level, and to become non-conductive in response to the load voltage decaying from the upper level to a predetermined lower level. Bistable switching circuitry, connected to an output of the SCR switch, serves as a current source in response to the SCR conducting, and as a current sink in response to the SCR latch becoming non-conductive. The bistable circuitry provides "snap action" control of an output transistor, which is coupled to the converter, when its load voltage rises and falls, respectively, to the upper and lower levels of the prescribed range, so that the voltage regulating circuitry has a stable, well defined hysteresis.

9 Claims, 1 Drawing Sheet

VOLTAGE REGULATING CIRCUITRY FOR A DC TO DC CONVERTER

This is a continuation-in-part of application Ser. No. 870,574, filed June 4, 1986.

BACKGROUND OF THE INVENTION

1. Field of the Invention

The present invention relates generally to voltage regulating circuitry. More particularly, the invention relates to self-powered voltage regulating circuitry having hysteresis for controlling the operation of a DC to DC converter.

2. Description Relative to the Prior Art

There are a variety of characteristics that circuitry for regulating the operation of a DC to DC converter should have. First, the output of such circuitry should be a true digital signal. That is, the output should be in logic one state while a load voltage to be regulated is increasing toward a predetermined upper level, and in a logic zero state while the load voltage is decaying from the upper level toward a predetermined lower level. Second, switching into either the logic zero state or the logic one state should occur, respectively, at precisely the upper level and the lower level. This assures that the regulating circuitry has a well behaved hysteresis, so that the DC to DC converter accurately controls a load voltage within a prescribed range. Third, the regulating circuitry should draw no power directly from a source voltage of the converter. This not only eliminates the need for an external mode switch, it also prevents any direct coupling to the source which might inadvertently switch the regulating circuitry on or off.

There is known in the prior art a variety of voltage regulating circuits which embody some of these operating characteristics. It is believed, however, that none of these circuits possesses all characteristics.

For example, a simple voltage comparator circuit can provide a stable, well defined hysteresis. A comparator, however, requires power from a supply to operate, which forces the use of a switch if no supply power is to be dissipated while the regulating circuit is in its off state and power supply interactions are to be avoided.

Another prior art regulating circuit employs timing circuitry for controlling a load voltage. An arrangement of this type suffers from a disadvantage in that the timing circuitry has a switching point that can vary over a range of load voltage levels. Thus the hysteresis of the regulating circuitry is poorly defined, which makes it difficult to maintain the load voltage precisely within a prescribed range. Either an excessive or a deficient voltage can result in poor system performance. Furthermore, excess voltage can damage electrical components.

SUMMARY OF THE INVENTION

In view of the foregoing, an object of the invention is to provide self-powered voltage regulating circuitry for maintaining the load voltage of a DC to DC converter within a precisely defined range. This object is achieved with voltage regulating circuitry having voltage-sensitive switching means connected to conduct when the load voltage of the DC to DC converter reaches a predetermined upper level. An SCR latch, connected to the voltage-sensitive switching means, (1) becomes conductive upon the load voltage increasing to the predetermined upper level, and (2) becomes non-conductive in response to the load voltage decaying from the predetermined upper level to a predetermined lower level. Bistable switching circuitry, connected to an output of the SCR latch, has (1) a first discrete state in response to the SCR latch becoming conductive when the load voltage reaches the predetermined upper level, and (2) a second discrete state in response to the SCR latch becoming non-conductive when the load voltage decays to the predetermined lower level. A transistor, coupling the bistable switching circuitry and the DC to DC converter, is arranged for terminating the operating of the converter while the bistable switching circuitry is in its first discrete state, and for permitting the operating of the converter while the bistable switching circuitry is in its second discrete state.

The invention, and its other advantages, will become more apparent in the detailed description of a preferred embodiment presented below.

BRIEF DESCRIPTION OF THE DRAWING

In the detailed description of a preferred embodiment of the invention presented below, reference is made to the accompanying drawing, in which.

DETAILED DESCRIPTION OF A PREFERRED EMBODIMENT

Voltage regulating circuitry, in accordance with the present invention, will be described with reference to use with a DC to DC converter for an electronic flash circuit. It is to be understood, however, that the present invention is suitable for a variety of applications in which a battery-powered converter maintains a load voltage within a prescribed range. It is also to be understood that electronic flash elements not specifically shown or described may take various forms well known to those having skill in the art.

Figure 1:
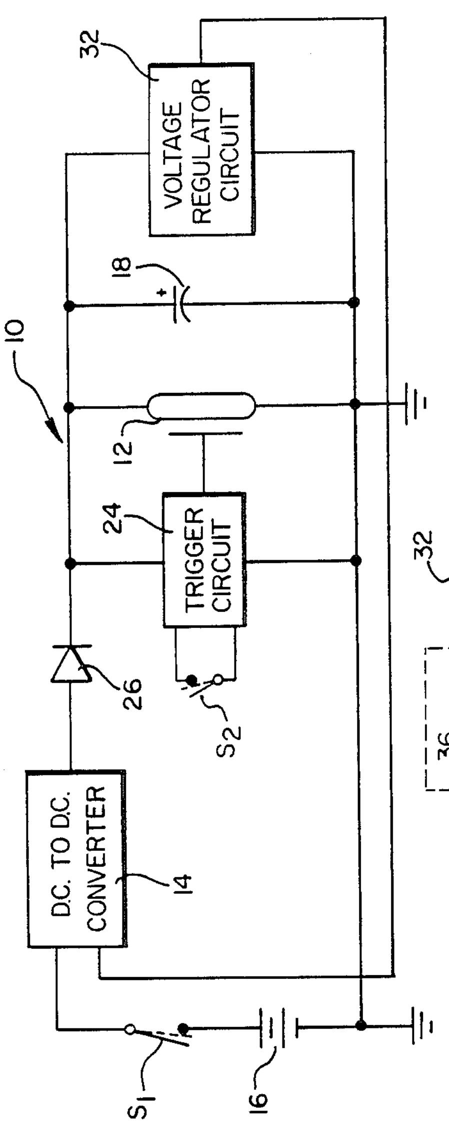
FIG. 1 illustrates an electronic flash circuit embodying voltage regulating circuitry, in accordance with the invention.

FIG. 1 shows an electronic flash unit 10 having a flash tube 12 for illuminating a subject to be photographed. The flash unit 10 includes a DC to DC converter 14 which is powered by a low-voltage battery 16 when a power switch $S_1$ is closed. A load capacitor 18, which receives the output voltage from the converter 14, serves to fire the flash tube 12. To that end, a conventional flash trigger circuit 24, which also receives the output voltage from the converter 12, triggers the tube 12 into conduction, in a manner well known to those skilled in the art, in response to the closing of a trigger switch $S_2$.

A diode 26 serves to half-wave rectify the pulsed output voltage of the converter 14, for furnishing a pulsed charging current to the capacitor 18 and a trigger capacitor (not shown) of the circuit 24. During the charging of the capacitor 18, its voltage increases generally exponentially toward a maximum level that is related to the voltage of the battery 16 and the voltage amplification characteristics of the converter 14. For example, a DC to DC converter for conventional electronic flash circuitry may be powered by a 6-volt battery for charging a flash-firing capacitor and a flash trigger capacitor from ground to a maximum level of approximately 350 volts within ten to twenty seconds.

When used for an electronic flash unit, the converter 14 may be any of a variety of oscillators known in the art as "flyback" or voltage step-up converters, which are commonly employed in the charging of a load capacitor to a relatively high voltage from a relatively low-voltage battery.

An object of the present invention is to provide self-powered voltage regulating circuitry. For that purpose, voltage regulating circuitry 32 operates in response to the voltage across the load capacitor 18, and, in so doing, serves to terminate the operation of the converter 14 when the capacitor 18 is charged to a predetermined upper voltage level—for example 300 volts—and to permit the restarting of the operation of the converter when the capacitor is discharged to a predetermined lower voltage—for example 290 volts. A gradual discharging of the capacitor 18 to the intermediate voltage level can occur either as the result of charge leaking from the capacitor or as the result of a somewhat more rapid discharge of the capacitor 18 caused by the supplying of power to the circuitry 34. Because of the generally heavy current drawn from the battery and the possibility of noise caused by DC to DC converter when it is operating, it may be preferred that additional means, known in the art, be included for temporarily preventing the operation of the converter 14 when the capacitor 18 discharges as the result of the firing of the flash unit 10.

The invention also maintains the load voltage of the DC to DC converter 14 within a precisely prescribed range. For that purpose, the voltage regulating circuitry 32 has a stable, well defined hysteresis. To that end, the voltage regulating circuitry 32 includes an SCR latch, to be described in detail hereinafter, connected to become conductive upon the load voltage of the converter 14 reaching the aforementioned predetermined upper level, and to become non-conductive in response to the load voltage decaying from the predetermined upper level to the predetermined lower level. With this arrangement, voltage regulating circuitry 32, by means of a bistable switching circuitry coupled to the SCR latch, provides a digital control pulse for "snap-action" control of its output stage when the load voltage of the converter rises and falls to respective upper and low points of the prescribed voltage range. This control is accomplished by bidirectional regenerative switching of the SCR latch.

Figure 2:
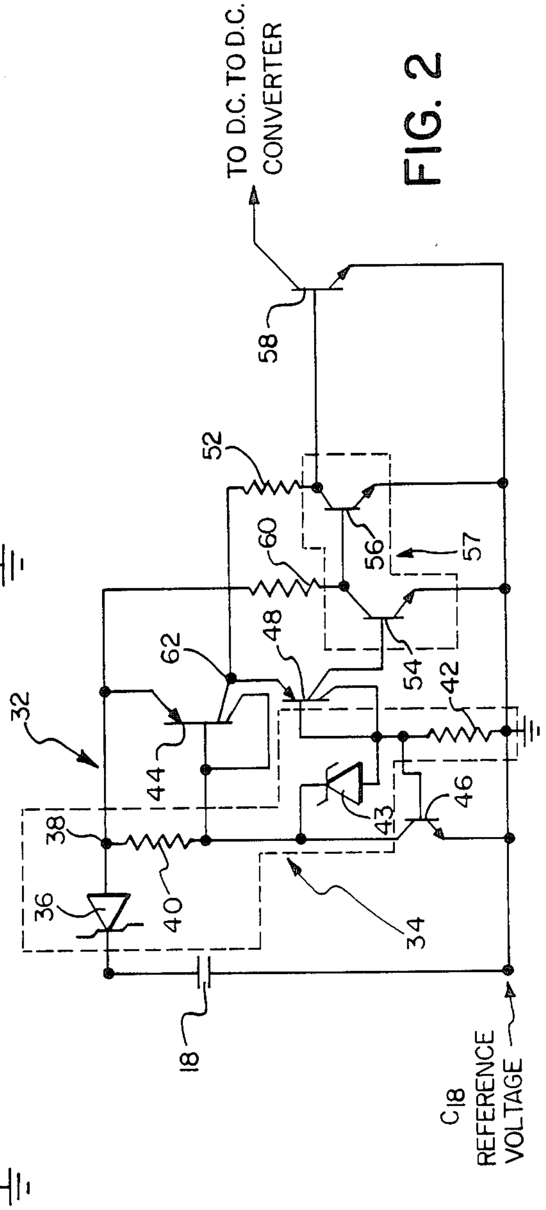
FIG. 2 is a schematic diagram of the voltage regulating circuitry of FIG. 1.

Referring now to FIG. 2, the voltage regulating circuitry 32 in accordance with the invention includes voltage-sensitive switching means 34 connected to conduct when a progressively increasing voltage applied to the load capacitor 18 reaches the aforementioned predetermined upper level. To that end, the switching means 34 includes a zener diode 36, which serves to enable operating power to be applied to the voltage regulating circuitry 32 when the capacitor 18 is charged within the aforementioned prescribed range. For that purpose, the diode 36 has a reverse breakdown voltage of a magnitude that permits current to flow into a junction 38 of the voltage regulating circuitry 32 whenever the capacitor 18 is charged above the lower level of the prescribed range.

The voltage-sensitive switching means 34 further includes a pair of bias resistors 40 and 42 serially connected through a zener diode 43. The diode 43 serves to regulate the magnitude of the hysteresis over which the converter 14 maintains voltage on the capacitor 18. To that end, the diode 43 conducts at a reverse breakdown voltage that is functionally related to the difference between the upper level and the lower level of the prescribed range.

A PNP transistor 44 and an NPN transistor 46, interconnected to form a regenerative feedback pair, serve as an SCR latching switch. To that end, a collector electrode of the PNP transistor 44 supplies base drive for the NPN transistor 46, through a dual collector, one-to-one current-dividing PNP transistor 48. Similarly, the collector of the transistor 46 provides base drive for the transistor 44. In so doing, the SCR latching switch functions to conduct upon the voltage applied to the capacitor 18 reaching the predetermined upper level of the prescribed range, and to become non-conductive in response to the voltage of the capacitor decaying from the upper level to the predetermined lower level.

In its operation as an SCR latch, the transistor 44 turns on and off only after the corresponding turning on and off of the transistor 46. To that end, the aforementioned resistors 40 and 42 serve to provide base bias voltage to the transistor 44 and to the transistor 46, respectively. To assure that the transistor 46 turns on prior to the transistor 44, the resistor 42 is larger than the resistor 40. In a preferred embodiment, the ratio of their respective resistances is approximately two to one.

To assure that the transistor 46 turns off before the transistor 44 turns off, the transistor 44 divides its collector current disproportionately into two currents, with the lower of these currents determining the base drive for the transistor 46. To that end, a resistor 52, through which one of the two collector currents flows, has a resistance that is small relative to the resistance of the resistor 42, which regulates the magnitude of the second collector current. Since the collector of the transistor 46 provides base drive for the transistor 44, the latter is caused to turn off immediately after the transistor 46 turns off blocking base current of the transistor 44.

A pair of NPN switching transistors 54 and 56, coupled to the SCR latching switch through the transistor 48, serves as bistable switching circuitry, denoted 57, having first and second discrete output states, so that the voltage regulating circuitry 32 has stable, precisely defined output states. For that purpose, the bistable switching circuitry 57 has (1) a current sourcing output state in response to the SCR latching switch becoming conductive when the capacitor 18 is charged to the upper level of the prescribed range, and (2) a current sinking output state in response to the SCR latching becoming non-conductive when the capacitor 18 discharges to the lower level.

An NPN transistor 58, coupling the output of the bistable switching circuitry 57 and the DC to DC converter 14, serves for terminating the operating of the converter while the output of the bistable switching circuitry is in its current sourcing state, and for permitting the operating of the converter while the output of the bistable circuitry is in its current sinking state. The output transistor 58 can be replaced with a PNP transistor whose emitter is connected to the collector of the transistor 56 in applications where the C18 reference voltage is a positive voltage.

For the purpose of describing the operation of the circuitry 32, it is assumed that the converter 14 charges the capacitor 18 to a predetermined upper voltage of approximately 300 volts, and that the converter is caused to reinitiate a charging operation when the capacitor 18 discharges to approximately 290 volts.

For that range of voltages, the diode 36 is selected to have a reverse breakdown voltage of 288.3 volts, and the diode 43 is selected to have a reverse breakdown voltage of 10.3 volts. It will be clear to those skilled in the art from the description to follow, that in the selecting of each threshold switching voltage to achieve a desired load voltage of the converter 14, allowance is made to accommodate the voltage drops across the respective active circuit elements when they conduct.

Operation of the circuitry of the flash unit 10 is as follows. When the switch $S_1$ (FIG. 1) is closed (by means not shown), the converter 14 commences to charge the capacitor 18. The specific manner in which the converter 14 operates to cause the capacitor 18 to store a voltage which is increasing progressively with time is well known in the art and is not relevant to the invention.

When the capacitor 18 becomes charged to 288.3 volts, the zener diode 36 switches into conduction. At this time, current commences to flow from the diode 36 and through a resistor 60 into the base of the NPN transistor 56, thereby turning it on. This clamps the base of the transistor 58 near ground potential. Thus, the transistor 58, which was previously off by means of an open base electrode, is now held off positively by means of a shorted base electrode. While the transistor 58 is off, the converter 14 continues the charging of the capacitor 18.

As the voltage stored by the capacitor 18 increases beyond 288.3 volts toward the upper level of 300 volts, the voltage at the junction 38 initially increases progressively with time, directly with the increase in voltage across the capacitor 18.

When the voltage at the junction 38 rises to approximately 10.3 volts,—the voltage on the capacitor 18 now approximates 298.6 volts—the zener diode 43 switches into conduction. When this occurs, current can now flow from the junction 38 through the serial connection of the resistor 40, the diode 43, and the resistor 42 to ground, as the voltage at the junction 38 rises beyond 10.3 volts. Thus, as the voltage across the capacitor 18 rises beyond 298.6 volts, the sum of the voltages across the resistors 40 and 42 increases correspondingly.

Because of the relative values of the two resistors 40 and 42, the voltage across the resistor 42 increases twice as fast as the voltage across the resistor 40. Thus, the transistor 46, which switches into conduction when the voltage across the resistor 42 increases to about 0.7 volt, turns on prior to the transistor 44. When the control voltage at the junction 38 rises sufficiently to also produce a voltage across the resistor 40 of about 0.7 volt, the transistor 44 also switches into conduction.

At that point, the capacitor 18 is charged to the desired upper level of 300 volts. When this occurs, the voltage at the junction 38 is clamped at approximately 11.7 volts—the reverse breakdown voltage of the diode 43 plus the base-emitter voltages of the transistors 40 and 42. Any further small increase in voltage across the capacitor 18, causes a rapid increase in current through the diode 36. This increasing diode current flows primarily into the emitter of the transistor 44, because current through the resistor 40 and current in the resistor 60 are now fixed by the respective base-emitter voltages of the transistor 44 and the transistor 56.

Initially, the transistor 44 supplies its increasing current to the transistor 46 through the transistor 48 and to the transistor 56 through the resistor 52. Thus, the transistor 58 remains off, under the influence of the transistor 56. At the same time, the SCR latch turns on regeneratively since the transistor 46, under the influence of additional base drive current supplied to it by the transistor 48, pulls additional current, in turn, through the transistor 44.

Increasing emitter current, however, drives the transistor 44 rapidly toward saturation, thereby raising the voltage at its collector junction 62. When the voltage at the junction 62 increases to a fixed level, corresponding to the sum of the respective base-emitter turn on voltages of the transistor 46 and the transistor 48, the latter now conducts fully. When this happens, the transistor 48 short circuits the diode 43.

The SCR latching switch is now latched on, as both the transistor 44 and the transistor 46 are now able to conduct without the benefit of the diode 43. With the diode 43 now off, the voltage at the junction 38 drops immediately to a level corresponding to the sum of the saturation voltage of the transistor 44, and the base-emitter voltages of the transistors 48 and 46. This sudden drop in voltage at the junction 38 further increases the current into the transistor 44.

With the transistor 48 conducting even more heavily, its increasing collector current divides equally between the transistor 46 and the NPN transistor 54, which is thereby turned on. The transistor 56 turns off, under the influence of the transistor 54. This allows the output transistor 58 to turn on sharply under the influence of current supplied by the transistor 44 through the resistor 52. As long as the transistor 58 is on, the operation of the converter 14 is terminated. From the foregoing sequence of switching operations, however, it is clear that the bistable switching circuitry 57 has an output state that serves to cause a source of current to be provided to the transistor 58 only after the SCR switch is latched on regeneratively.

While the converter 14 is off, the voltage on the capacitor 18 decays toward the aforementioned predetermined lower value of 290 volts as charge is removed from the capacitor, for example, through leakage, and through its discharge through the diode 36.

As long as the voltage at the junction 38 remains greater than the saturation voltage of the transistor 44 plus the respective base-emitter voltages of the transistors 48 and 46, however, the voltage at the junction 62 remains clamped at a fixed level above ground. While this condition exists, there is constant base current to the transistor 58 through the resistor 52, which serves to maintain the output transistor 58 on and, thereby the converter 14 off.

As the voltage of the capacitor 18 decreases, the collector current of the transistor 44 eventually begins to decrease as the capacitor voltage approaches 290 volts. Because of the way this collector current is divided disproportionately, sufficient base drive is still provided to the transistor 58 to maintain it on, whereas insufficient emitter current is available for the transistor 48. Thus, the transistor 46 under the control of the transistor 48, begins to turn off.

As the transistor 46 begins to turn off, the SCR switch unlatches regeneratively as the transistor 44 follows the transistor 46. That is, the transistor 46 begins to block base current from the transistor 44, which causes the transistor 44 to turn off faster in response to the turning off of the transistor 46. At the time the SCR switch unlatches regeneratively, however, there is still sufficient base current from the junction 62 through the resistor 52, to maintain the transistor 58 in its conductive state.

With the transistor 44 now off, the transistor 48 immediately turns off. This removes base drive current from the transistor 54, which, in turning off, removes ground from the base of the transistor 56. In this condition, the bistable switching circuitry 57 now has an output state that serves as a current sink, as the sole path for current from the diode 36 now resides through the resistor 60 and the transistor 56 to ground. Thus, the transistor 56 turns on, which grounds the base of the transistor 58. This also pulls the voltage at the junction 62 down through the resistor 52, which regeneratively switches off the transistor 54 of the bistable switching circuitry 57. When this happens, the converter 14 is permitted to again turn on, to recharge the capacitor 18 back to 300 volts.

From the foregoing, the output transistor 58 of the circuitry 32 has only two well defined digital states for controlling the converter 14. One state occurs only after the SCR switch is latched on, when a predetermined upper level of load voltage is reached; the second state, on the other hand, occurs only after the SCR is latched off, when the load voltage decays from the upper level to a predetermined lower level. A particular advantage of this digital output is that variations in current through the diode 36 while the voltage across the capacitor 18 decays have no affect on the operation of the converter 14.

Furthermore, the circuitry 32 is self-powered, as it draws its power from the capacitor 18, and no direct power from the battery 16. This feature eliminates the need for an external mode switch to the regulating circuitry 32, while isolating the regulating circuitry from any source voltage transients.

The invention has been described in detail with particular reference to a preferred embodiment thereof, but it will be understood that variations and modifications can be effected within the spirit and scope of the invention.

I claim:

1. In control circuitry for terminating the operating of a DC to DC converter when a load capacitor is charged to a predetermined upper level and for restarting the operating of the converter when the capacitor discharges to a predetermined lower level, wherein the improvement comprises:

(a) an SCR latch connected for bidirectional regenerative switching (1) to change rapidly from a latched non-conducting state to a latched conducting state upon the progressively increasing voltage applied to the load capacitor reaching the aforementioned predetermined upper level, and (2) to change rapidly from its latched conducting state back to its latched non-conducting state in response to the voltage of the load capacitor decaying from the predetermined upper level to the predetermined lower level;

(b) bistable switching circuitry connected with respect to said SCR latch and having only (1) a first discrete output state in response to said SCR latch assuming its latched conducting state when the load capacitor is charged to the predetermined upper level, and (2) a second discrete output state in response to said SCR latch assuming its latched non-conducting state when the load capacitor discharges to the predetermined lower level; and (c) a transistor, coupling said bistable switching circuitry and the DC to DC converter, for terminating the operating of the converter while said bistable circuitry assumes its first state, and for permitting the operating of the converter while said bistable circuitry assumes its second state.

2. Control circuitry as claimed in claim 1 wherein said SCR latch comprises a first transistor and a second transistor interconnected to form a regenerative feedback pair.

3. Control circuitry as claimed in claim 2 wherein:

(a) said first transistor has a collector terminal, an emitter terminal, and a base terminal; and (b) said second transistor has a collector terminal, an emitter terminal, and a base terminal, said collector terminal of said second transistor being connected to supply current to said base terminal of said first transistor, and said collector terminal of said first transistor being connected to provide drive current for said base terminal of said second transistor.

4. Control circuitry as claimed in claim 2 wherein said SCR latch is connected to cause said first transistor, in response to the progressively increasing voltage being applied to the load capacitor, to turn on prior to the turning on of said second transistor.

5. Control circuitry as claimed in claim 4 wherein said first transistor, in response to the voltage of the load capacitor decaying from the predetermined upper level toward the predetermined lower level, is caused to turn off prior to the turning off of said second transistor.

6. In control circuitry for terminating the operating of a DC to DC converter when a load capacitor is charged to a predetermined upper level and for restarting the operating of the converter when the capacitor discharges to a predetermined lower level, wherein the improvement comprises:

(a) voltage-sensitive switching means connected to conduct when the application of a progressively increasing voltage to the load capacitor corresponds substantially to the aforementioned predetermined upper level;

(b) an SCR latch-connected to said voltage-sensitive switching means for bidirectional regenerative switching (1) to change rapidly from a latched non-conducting state to a latched conducting state upon the progressively increasing voltage applied to the load capacitor reaching the aforementioned predetermined upper level, and (2) to change rapidly from its latched conducting state back to its latched non-conducting state in response to the voltage of the load capacitor decaying from the predetermined upper level to the predetermined lower level;

(c) bistable switching circuitry connected with respect to said SCR latch and having only (1) a first discrete output state in response to said SCR latch assuming its latched conducting state when the load capacitor is charged to the predetermined upper level, and (2) a second discrete output state in response to said SCR latch assuming its latched non-conducting state when the load capacitor discharges to the predetermined lower level; and (d) a transistor, coupling said bistable switching circuitry and the DC to DC converter, for terminating the operating of the converter while said bistable circuitry assumes its first state, and for permitting the operating of the converter while said bistable circuitry assumes its second state.

7. Control circuitry as claimed in claim 6 wherein said voltage-sensitive switching means includes zener diode means serially connected to a first resistor and to a second resistor.

8. Control circuitry as claimed in claim 7 wherein said SCR latch comprises a first transistor and a second transistor interconnected to form a regenerative feedback pair.

9. Control circuitry as claimed in claim 8 wherein said first resistor and said second resistor are interconnected to provide bias voltage to said first transistor and to said second transistor, respectively.

* * * * *